United States Patent [19]
Wootton et al.

[11] Patent Number: 5,459,470
[45] Date of Patent: Oct. 17, 1995

[54] BEAM STEERED LASER IFF SYSTEM

[75] Inventors: John R. Wootton; Gary Waldman, St. Louis County; David Holder, St. Charles County, all of Mo.

[73] Assignee: Electronics & Space Corp., St. Louis, Mo.

[21] Appl. No.: 80,692

[22] Filed: Jun. 22, 1993

Related U.S. Application Data

[63] Continuation of Ser. No. 861,533, Apr. 1, 1992, abandoned.
[51] Int. Cl.$^6$ .................................................. G01S 13/79
[52] U.S. Cl. .................... 342/45; 342/6; 342/54
[58] Field of Search ....................... 342/42, 43, 44, 342/45, 50, 51, 54, 59, 6

[56] References Cited

U.S. PATENT DOCUMENTS

| | | | |
|---|---|---|---|
| 3,911,433 | 10/1975 | Redman | 342/53 |
| 3,989,942 | 11/1976 | Waddoups | 342/6 X |
| 4,085,319 | 4/1978 | Deitz et al. | 359/183 |
| 4,134,008 | 1/1979 | de Courlieu et al. | 250/199 |
| 4,143,263 | 3/1979 | Eichweber | 250/199 |
| 4,249,265 | 2/1981 | Coester | 455/604 |
| 4,658,147 | 4/1987 | Eldering | 250/566 |
| 4,731,879 | 3/1988 | Sepp et al. | 455/604 |
| 4,763,361 | 8/1988 | Honeycutt et al. | 455/605 |
| 4,814,769 | 3/1989 | Robin et al. | 342/45 |
| 4,873,434 | 10/1989 | See et al. | 250/235 |
| 4,926,182 | 5/1990 | Ohta et al. | 342/44 |
| 4,946,264 | 8/1990 | Davis | 350/486 |
| 5,001,348 | 3/1991 | Dirscherl et al. | 290/372 |
| 5,001,488 | 3/1991 | Joguet | 342/45 |
| 5,021,790 | 6/1991 | Ohta et al. | 342/44 |
| 5,029,967 | 7/1991 | Livezey et al. | 350/96.19 |
| 5,117,126 | 5/1992 | Geiger | 359/330 |
| 5,130,713 | 7/1992 | Wagner | 342/45 |
| 5,170,168 | 12/1992 | Roth | 342/45 |
| 5,173,705 | 12/1992 | Camiade et al. | 342/42 |
| 5,274,379 | 12/1993 | Carbonneau et al. | 342/45 |

*Primary Examiner*—John B. Sotomayor
*Attorney, Agent, or Firm*—Polster, Lieder, Woodruff & Lucchesi

[57] ABSTRACT

A system (10) for friend-or-foe identification (IFF) comprises an interrogator unit (18) carried on a first platform (T1) for generating and transmitting a laser beam. A control unit (22) selectively directs the transmitted laser beam toward a second platform (T2). A coding/decoding unit (28) encodes an IFF interrogator message with which a portion of the transmitted laser beam is modulated. A laser reflector (30) carried on the second platform receives the coded laser beam. The reflector is a normally passive reflector which is activated by receipt of the transmitted laser beam. The reflector responds to the IFF message contained in the received laser beam by modulating the unmodulated portion of the transmitted laser beam. This newly modulated portion of the laser beam is reflected back toward the first platform. The coding/encoding unit decodes on the first platform receives and the response, and determines if it corresponds to a predetermined response which identifies the second platform as a "friend".

22 Claims, 2 Drawing Sheets

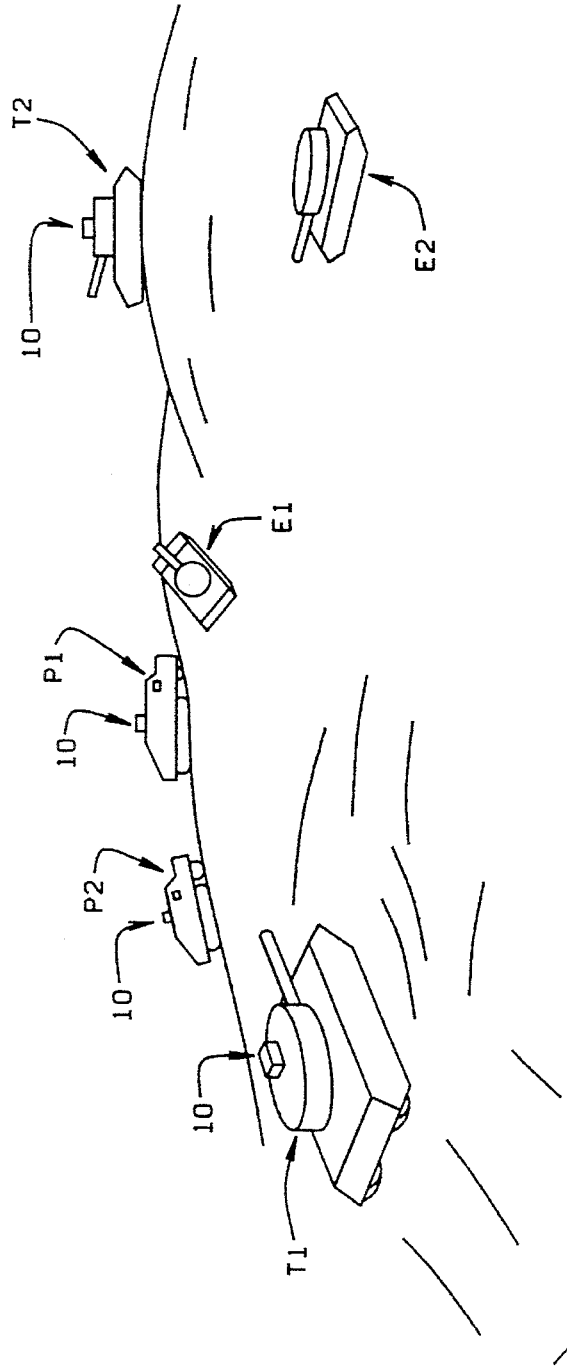
FIG. 1
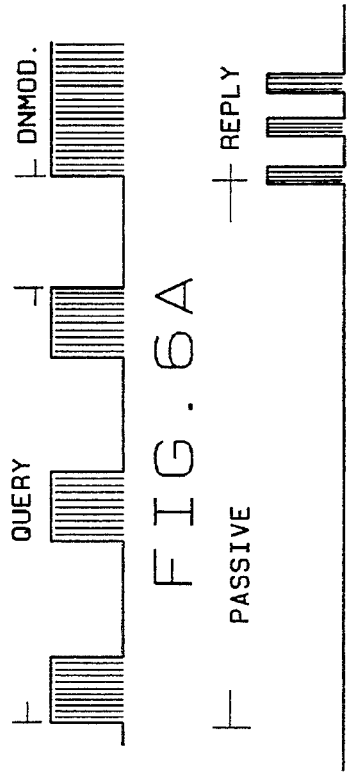
FIG. 6A
FIG. 6B
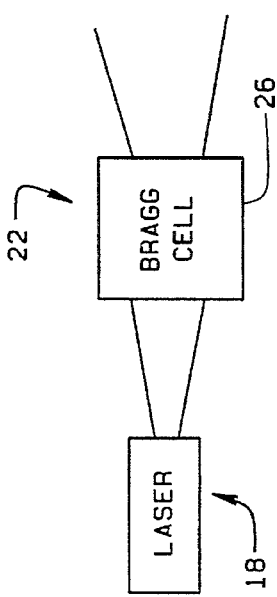
FIG. 5B

5,459,470

BEAM STEERED LASER IFF SYSTEM

This is a continuation of application Ser. No. 07/861,533, filed on Apr. 1, 1992, now abandoned.

BACKGROUND OF THE INVENTION

This invention relates to friend-or-foe identification systems (IFF), and more particularly, to a beam steered laser IFF system for use in battlefield environments.

With the advent of modern warfare, a battlefield is obviously a very dangerous place. Unfortunately, this is so both for one's comrades-in-arms as well as for the enemy. Given the amount of firepower deployed in a battle zone, the constant movement of men and material, the rapidity with which tanks, personnel carriers (APC's), planes, helicopters move, and the inability to always know (regardless of the amount of effort employed) who is where, the chances of fratricidal harm being inflicted are probably higher than they have ever been. It has thus become an imperative to greatly limit, if not altogether eliminate, casualties resulting from "friendly" fire.

One way of discerning who is a friend and who is not is by use of an IFF (Identification Friend-or-Foe) system. Various IFF systems are well-known in the art. These are typically radio frequency (RF) transmission systems, and while principally associated with aircraft, the same technology is applicable to land based vehicles, or ships. Certain RF systems, known as a co-operative systems, involve transmitting an inquiry signal to an unknown object (airplane, ship, tank). If the object is a "friendly", it has some type of transponder for responding to the inquiry with an appropriate reply. Upon receipt of an appropriate reply, the object is designated as friendly. If the object does not provide the required response, it is designated a foe and may be attacked. One drawback with co-operative systems is that it is always necessary for the object under inspection to have some mechanism for responding to an interrogation. A second drawback is that while co-operative IFF systems are the most positive types of identification systems, and have been employed for a number of years in a variety of forms, they are not infallible. This is so for a number of reasons. For example, the response mechanism on the interrogated object may be inoperative. Or, because these type systems utilize codes, the code in the response mechanism may not be up-to-date. Consequently, the failure to respond to an interrogation signal cannot always be taken as an indication that the unknown object is hostile. As RF systems, they are vulnerable to jamming. Also, because of the power requirements of RF systems, they tend to be large.

A third factor which must be considered is battlefield density. Tanks, APC's, trucks, etc., have a high spatial density. In this era of the non-linear battlefield, the possibility of friendly and enemy forces being close together is very high. Consequently, in using a co-operative system, care must be taken to avoid any ambiguities in an IFF identification. A spatially selective IFF system, using current RF technology, would require a small bandwidth and a correspondingly large antenna. At the same time, the system must have hemispheric coverage; which, in turn, requires electronic or electro-mechanical beam scanning. The result would be an expensive and impractical solution.

What is required is a type of interrogation system which provides the required selectivity without use of a cumbersome scanning technique. Such a system would produce the needed area coverage, and would do so in a cost effective and space effective manner. It would also be advantageous if the system had minimum reliance on the operability, or up-to-date information, carried by any queried targets. In this regard, laser technology may be employable in IFF systems. It is known in the art, for example, to transmit a laser beam at an unknown object and have the incident beam reflected back using a retroflector. See, for example, U.S. Pat. Nos. 5,001,348 and 4,814,769. While useful, these laser techniques still do not solve the problems. The retro-reflector is a passive unit, and the laser beam directed at the target does not include intelligence to provoke a desired response.

SUMMARY OF THE INVENTION

Among the several objects of the present invention may be noted the provision of an identification friend-or-foe (IFF) system for use in battlefield environments to quickly and accurately distinguish friendly from enemy forces; the provision of such a system which is readily integrated into existing communications and fire control systems; the provision of such an IFF system which is spatially selective in order to distinguish between friend and foe even on crowded battlefields in which enemy and friendly vehicles may be closely intermixed, and in dynamic battlefield situations in which the vehicles' relative positions rapidly change; the provision of such a system to be multi-mode so it can interrogate a single target or rapidly interrogate a series of targets to be queried; the provision of such a system in which the laser beam is steerable so as to specifically direct it at a particular target of inquiry; the provision of such a system to provide secure, covert IFF interrogations using a narrow bandwidth, coded transmission; the provision of such a system to not provide an increased cross-section, or visual or IR signal to an enemy; the provision of such a system for achieving spatial selectivity using low power, rugged, and highly reliable modular solid state electronic and laser technology employing standard IFF coding techniques; the provision of such a system having no moving parts; the provision of such a system to employ an active transmitter and a normally passive receiver which is activated by receipt of an inquiry; the provision of such a system to be selectively mounted on a particular vehicle such as a lead tank; and, the provision of such a system to which is resistant to jamming.

In accordance with the invention, generally stated, a system for friend-or-foe identification (IFF) comprises an interrogator unit carried on a first platform for generating and transmitting a laser beam. A control unit selectively directs the transmitted laser beam toward a second platform. A coding/decoding unit encodes an IFF interrogator message with which a portion of the transmitted laser beam is modulated. A laser reflector carried on the second platform receives the laser beam. The reflector is a normally passive reflector which is only activated by the transmitted, coded laser beam. The reflector responds to the IFF message contained in the received laser beam by modulating the unmodulated portion of the transmitted laser beam. This newly modulated portion of the laser beam then becomes part of the reflected laser beam. The coding/encoding unit on the first platform receives and decodes the response message. It then determines if the decoded response corresponds to a predetermined response which identifies the second platform as a "friend". Other objects and features will be in part apparent and in part pointed out hereinafter.

BRIEF DESCRIPTION OF THE DRAWINGS

FIG. 1 is a representation of a battlefield environment in which an identification friend-or-foe (IFF) system of the present invention may be employed;

FIG. 5b illustrates use of a Bragg cell for use as a steering unit with the laser interrogator unit;

FIG. 6a represents a transmitted laser waveform modulated with an encoded query message; and FIG. 6b represents a reflected, return laser waveform modulated with an encoded reply message.

Corresponding reference characters indicate corresponding parts throughout the drawings.

DESCRIPTION OF A PREFERRED EMBODIMENT

Figure 2:
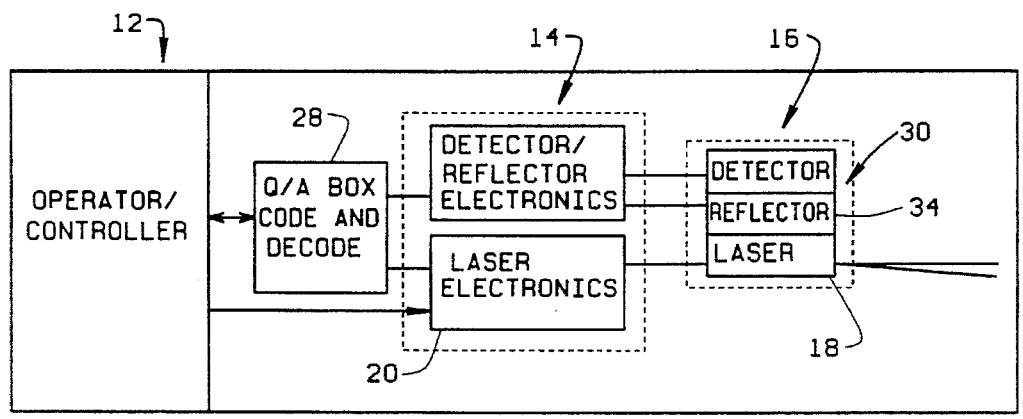
FIG. 2 is a block diagram of the IFF system.

Referring to the drawings, FIG. 1 represents a battlefield environment in which both friendly and hostile forces are present. The friendly forces include tanks T1 and T2, and personnel carriers P1 and P2. The enemy forces are represented by tanks E1 and E2. Because of the fluid situation encountered on modern battlefields; i.e., where mobility is very important, the spatial separation between forces in constantly in flux. As a consequence, the friendly and enemy forces may often be in close proximity to one another. In FIG. 1, this is represented by the small spatial separation between enemy tank E1 and friendly personnel carrier P1, as contrasted with the spatial separation between enemy tank E2 and friendly tank T2. One purpose of friendly tanks T1 and T2 is to destroy enemy tank E1. However, given the constant movement of the forces, the dust, noise, etc., it may not possible to either visually discern or verbally determine which vehicle as among tank E1 and carriers P1 and P2 is "friend" and which is "foe". And, unless this information is known, there is a possibility that a projectile fired by tank T1 or T2 may be aimed at one of the friendly vehicles rather than the enemy. To prevent this, it is important to be able to quickly and accurately distinguish between the two forces.

Identification friend-or-foe systems have been previously used to discern friend from foe. While useful, these systems are basically radio frequency (RF) systems. As such they have a number of drawbacks. For example, they can be jammed. Also, the transponder or receiver which is used to answer any friend-or-foe query must always be operating. Since the transponder has active components, if these fail, the targets ability to answer a query is lost, thus endangering the vehicle and its personnel.

Referring to FIG. 2, a friend-or-foe identification system 10 of the present invention is shown. System 10 is installed on a platform such as tanks T1 and T2, or personnel carriers P1 and P2. Each system includes both means for interrogating another vehicle, and means for responding to an inquiry. A platform such as the tank or personnel carrier does not necessarily have to carry both means. The interrogation and response portions of the system are implemented in three components. These are an operator/controller module 12, an electronics unit 14, and a communications module 16.

Figure 5A:
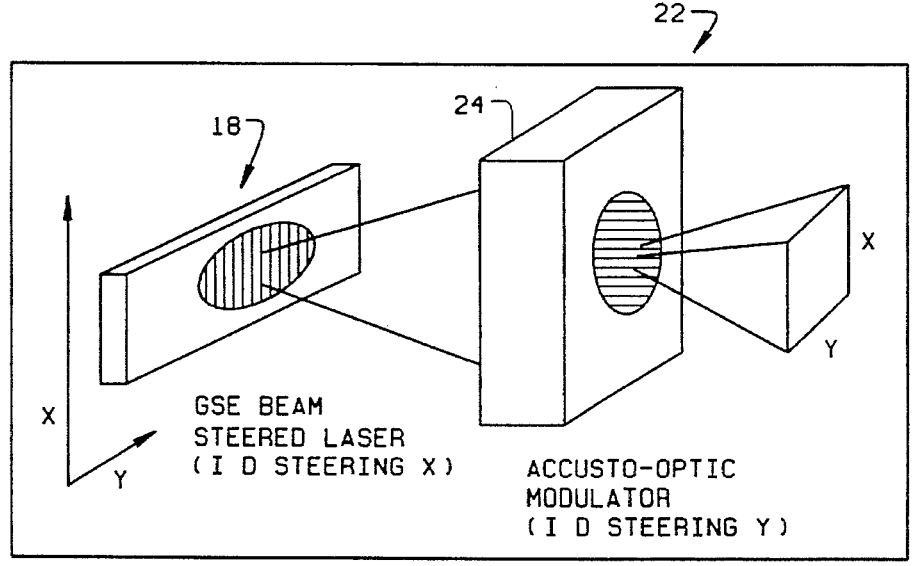
FIG. 5a illustrates a grated surface emitting (GSE) laser interrogator unit and an acousto-optical modulator for steering a laser beam generated by the unit.

In operation, an observer on a first platform such as tank T1 selects a target to interrogate. He may do this using, for example, a television camera, or a forward looking infrared receiver (FLIR). Once a target has been selected, the observer activates an interrogation means 18 in communications module 16. Interrogation means 18 is a laser generator which generates and transmits a laser beam. As shown in FIGS. 5a and 5b, the laser generator comprises a grated surface emitting laser generator which produces a laser beam steerable on one axis. The interrogation means is controlled through a laser electronics 20 contained in electronics unit 14.

A control means 22 is used to direct the transmitted laser beam toward the selected target which is, in effect, a second platform. As shown in FIG. 5a, the control means includes an acousto-optical modulator 24 for steering the laser beam in a second axis. Or, as shown in FIG. 5b, the control means alternately includes a Bragg cell 26 for steering the laser beam in the second axis.

Next, system 10 includes a coding means 28 for encoding an IFF interrogation message with which the transmitted laser beam is modulated. It will be understood that the coding means may be programmable so that each vehicle interrogated is interrogated with a different query. The particular message may then be selected by the operator when he selects the target. For example, one type message may be sent to a tank, and a second to a personnel carrier. Or, the message be selected at random in order to prevent an enemy from readily duplicating it. Other methods of selecting a transmitted inquiry may, of course, be employed.

Regardless of the type of message selection process employed, the selected message is supplied through the operator module 12 to the laser electronics unit 20. Electronics unit 20 then modulates the transmitted laser beam with the inquiry message. As shown in FIG. 6a, only a portion of the transmitted beam is modulated. The remainder of the beam is, as shown, unmodulated.

A reflector means 30 is carried on the second platform for receiving the laser beam and reflecting it back toward the first platform. Means 30 responds to the IFF interrogation message contained in the received laser beam by reflecting it back to its source. In doing so, it modulates the reflected laser beam, as shown in FIG. 6b, with a response message. The electronics unit on the first or transmitting platform includes a detector electronics section 32 which processes the return waveform. The output of section 32 is supplied to coding means 28. The decoding means next decodes the response message. It then determines if the message corresponds to a predetermined response which identifies the queried vehicle as a "friend".

Figures 3, 4:
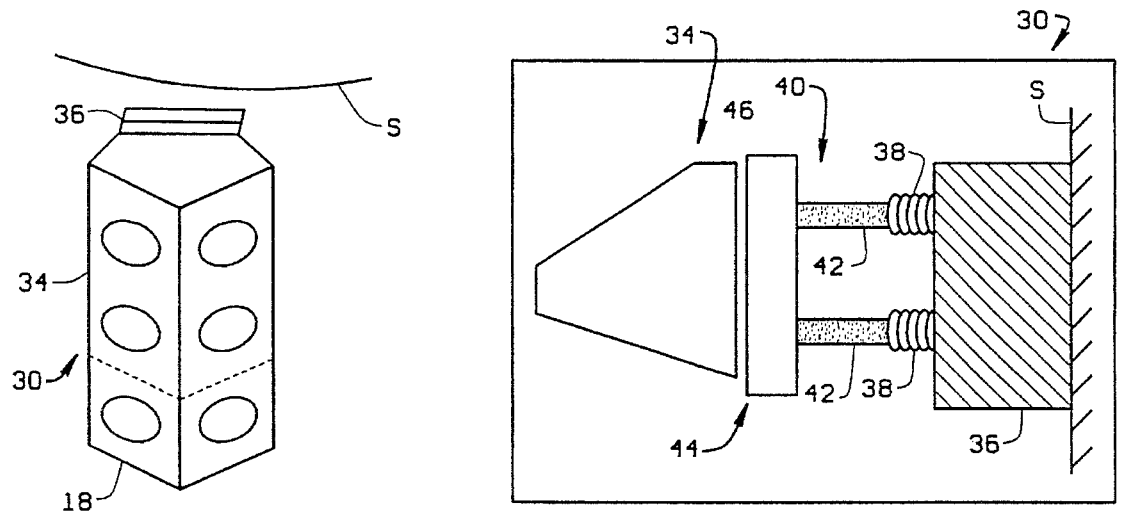
FIG. 3 is a perspective view of a communications unit carried on a target vehicle queried by the system.
FIG. 4 is an elevational view of a retro-reflector unit of the system.

It is an important feature of the present invention that reflector means 30 be a passive reflector which is only activated when a transmitted laser beam is received. For this purpose, the reflector means comprises a corner cube retro-reflector 34 having total internal reflectance. It will be understood that in order for the retro-reflector to cover 360°, it may be made up of eight 45° sections. The location of the retro-reflector may, for example, be atop the tank or personnel carrier, or it may be in some other exposed area where it provides full coverage. Referring to FIGS. 3 and 4, a base 36 is affixed to the side S of a vehicle, and the retro-reflector is mounted to this base. A plurality of reflector mounts 38 protrude outwardly from the base. The reflector means further includes positioning means 40 for positioning the retro-reflector 34 with respect to base 36. Means 40 includes a piezo-electric positioner 42 for each reflector mount 38.

As shown in FIG. 4, reflector means 30 includes a spoiler means 44 forming one side (the side connecting to base 36) of the retro-reflector. Means 44 comprises an optical energy absorber 46. The absorber rests upon the piezo-electric positioners 42. The positioners hold the energy absorber against or in close proximity to the retro-reflector. In this configuration, the reflector means is in its inactive, passive mode. When the modulated portion of the transmitted laser beam is received at the second platform, the absorber vibrates against the positioner. This vibratory motion, in turn, produces the modulation of the previously unmodulated portion of the laser beam (see FIG. 6B). Since this is reflected back to the transmitting vehicle, this modulation becomes the response message to the inquiry.

If energy absorber 46 is within ¼ wavelength of the incoming energy in a transmitted laser beam, then the reflector means remains passivated and there is no transmission from the retro-reflector back to the energy source. Consequently, the energy cross-section of the reflector means is at a minimum, expanding only when the modulated portion of an incident inquiry beam causes the reflector means to reflect a modulated response beam back to the transmitting platform. Only when the absorber is deflected one wavelength or more is the retro-reflector fully enabled to act as a corner reflector. The movement of the spoiler for the retro-reflector to go from fully active to passive is, for example, 1.3 um. for a 1.54 um. wavelength laser beam.

It will be understood that system 10 may be useful for a communications system in addition to an IFF system. Thus, the same basic configuration of components would allow tank T1, for example, to send preselected messages to specific vehicles. In such situations, it allows the tank to selectively communicate with one selected vehicle even though that vehicle is in close proximity to a number of other vehicles. Operation of system 10 to perform as a communications system is similar to that above described and will not be set forth in detail.

What has been described is an IFF and communications system which is useful in battlefield environments to prevent fratricidal situations where allied and enemy forces are in close proximity. System 10 is advantageous in that it employs a passive reflector which is only activated in the presence of a communication directed to it. Consequently there is no constant energy source which may allow the vehicle to otherwise be identified by enemy forces. The system can be implemented with state-of-the-art components.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

Having thus described the invention, what is claimed and desired to be secured by Letters Patent is:

1. A system of friend-or-foe identification (IFF) comprising:

interrogator means carried on a first platform for generating and transmitting a laser beam;

control means for selectively steering the transmitted laser beam toward one of a plurality of second platforms;

coding means for encoding an IFF interrogation message and modulating a first portion of the transmitted laser beam with the message, and for decoding any received return response to an interrogation message; and, passive reflector means including a normally passive, non-steerable reflector carried on one of said second platforms for receiving said transmitted laser beam regardless of the direction from which said transmitted laser beam is received and for reflecting energy contained in a received laser beam back toward said first platform with said energy contained in said reflected laser beam being transmitted only in the opposite direction from that in which said transmitted laser beam was received, said passive reflector being responsive only to a properly encoded IFF interrogation message contained in said received laser beam for said passive reflector means to be activated by the interrogation message and respond thereto by modulating a second portion of said laser beam with a response message which is transmitted back to said first platform, the passive reflector otherwise not responding to the receipt of any message but rather absorbing any energy contained therein, said decoding means decoding said response message and determining if said response message corresponds to a predetermined response which identifies the second platform as a "friend".

2. The system of claim 2 wherein the interrogator means includes a grated surface emitting laser generator for producing a laser beam steerable in one axis.

3. The system of claim 2 wherein the control means includes an acousto-optical modulator for steering the laser beam in a second axis.

4. The system of claim 1 wherein said retro-reflector is a corner cube retro-reflector having total internal reflectance with spoiler means forming one side thereof, the total internal reflectance of said retro-reflector, when a properly encoded IFF interrogation message is received, allowing energy contained in said received laser beam to be transmitted back to said first platform, but the spoiler means otherwise frustrating the reflectance so that the energy rather is absorbed by said retro-reflector and not reflected.

5. The system of claim 4 wherein said retro-reflector is fixedly mounted on a base attached to said second platform.

6. The system of claim 5 wherein said reflector means further includes positioning means for positioning the retro-reflector with respect to said base.

7. The system of claim 6 wherein said spoiler means includes an optical energy absorber mounted on a piezo-electric positioner comprising said positioning means, said energy absorber being held against said retro-reflector by said positioner, the retro-reflector being in an inactive, passive mode when said energy absorber is so positioned.

8. The system of claim 7 wherein said transmitted laser beam has a first modulated portion and a second unmodulated portion, said absorber being responsive to the modulated portion of said transmitted laser beam to vibrate against the positioner, the vibration of the absorber, in turn, modulating the second portion of the laser beam to create the response message reflected back to the first platform.

9. The system of claim 7 where said positioner means comprises a plurality of piezoelectric positioners.

10. The system of claim 9 wherein the spoiler means passivates the reflector mean when the spoiler means is within ¼ wavelength of the incoming energy in the transmitted laser 11. The system of claim 3 wherein the control means steers the transmitted laser beam successively toward a plurality of second platforms.

12. The system of claim 2 wherein the control means automatically steers the transmitted laser beam toward the second platforms.

13. The system of claim 2 wherein the control means includes a Bragg cell for steering the laser beam in a second axis.

14. A communications system for selectively communicating between an inquisitor and a plurality of possible respondents comprising:

signal generator means located at a transmission site for generating and transmitting an inquiry signal;

control means for selectively steering the inquiry signal to one of a plurality of receiving sites;

coder means for encoding an inquiry message and modulating a first portion of the inquiry signal with the message; and, passive receiver means at a receiving site for receiving said inquiry signal and reflecting a portion of said inquiry signal back to said transmission site, said receiver means being a fixedly mounted, non-steerable normally passive receiver for receiving said inquiry signal regardless of the direction from which said inquiry signal is received and for transmitting energy contained in said received inquiry signal back toward said transmission site with said energy being transmitted only in the opposite direction from that in which said inquiry signal was received, said receiver only being activated when an inquiry signal is received which is a properly encoded inquiry signal transmitted by the signal generator means, said receiver further responding to receipt of the properly encoded inquiry signal to modulate a second and subsequent portion of the inquiry signal with a reply message which is transmitted back to the inquiry site, the passive receiver otherwise not responding to the receipt of any message but rather absorbing any energy contained in the inquiry signal, and said coder means receiving said reflected signal and decoding said reply message to determine if the reply message is a proper response to the inquiry message.

15. The communications system of claim 14 wherein the signal generator means comprises means for generating a steerable laser beam which is transmitted at said transmission site.

16. The communications system of claim 15 wherein said receiver means includes a corner cube retro-reflector having total internal reflectance, said retro-reflector including an optical energy absorber comprising one side of the retro-reflector with said retro-reflector being in all inactive, passive mode when said energy absorber is so positioned, said transmitted laser beam having a first modulated portion and a second unmodulated portion, said absorber being responsive to the modulated portion of said transmitted laser beam to be activated by vibrating against the positioners vibration of the absorber, in turn, modulating the second portion of the laser beam to create the reply message reflected back to said transmission site, but the absorber otherwise frustrating the reflectance of said retro-reflector so any energy is absorbed by said retro-reflector and not reflected.

17. The communications system of claim 16 wherein said absorber passivates the retro-reflector when the absorber is within ¼ wavelength of the incoming energy in the transmitted laser beam.

18. A method of friend-or-foe identification (IFF) comprising:

generating and transmitting a laser beam by an interrogator means carried on a first platform;

selectively steering the transmitted laser beam toward one of a plurality of second platforms;

encoding an IFF interrogation message and modulating a first portion of the transmitted laser beam with the message;

receiving said laser beam by a normally passive, non-steerable reflector means fixedly mounted on one of said second platforms, said reflector means including a reflector for receiving said transmitted laser beam regardless of the direction from which said transmitted laser beam is received; and, reflecting said laser beam back toward said first platform including activating said reflector with the received beam, energy contained in a received laser beam being transmitted back toward said first platform only in the opposite direction from that in which said transmitted laser beam was received, the reflector responding only to a properly encoded IFF message contained in said received laser beam by modulating a second portion of said reflected laser beam with a response message, the reflector means otherwise remaining passive if it receives a message other than a properly encoded IFF message and absorbing any energy contained in said laser beam.

19. The method of claim 18 further including decoding said response message and determining if said response message corresponds to a predetermined response which identifies the second platform as a "friend".

20. A method of selectively communicating between an inquisitor and a respondent comprising:

generating and transmitting an inquiry signal by a signal generator means located at a transmission site;

selectively steering the inquiry signal to one of a plurality of receiving sites;

encoding an inquiry message and modulating a first portion of the inquiry signal with the encoded message; and, receiving said transmitted inquiry signal at the selected receiving site and responding thereto by reflecting a portion of said inquiry signal back to said transmission site, responding to receipt of said inquiry signal including activating a normally passive, fixedly mounted, nonsteerable receiver means for modulating the reflected signal with an encoded reply message only upon receipt of the encoded message, said non-steerable receiver means being capable of receiving said inquiry signal regardless of the direction from which said inquiry signal is transmitted and replying thereto by transmitting energy contained in said received inquiry signal back toward said transmission site with said energy being transmitted only in the opposite direction from that in which said inquiry signal was received;

receiving said reflected signal at said transmission site;

decoding said reply message: and, determining if the reply message is a proper response to the inquiry message.

21. The method of claim 20 wherein receiving of said transmitted signal includes receiving said signal by a passive retro-reflector, and the method further includes activating said retro-reflector only upon receipt of a properly encoded inquiry signal, said retro-reflector further responding to receipt of the properly encoded inquiry signal by modulating a second and subsequent portion of the inquiry signal with a reply message which is transmitted back to the inquiry site, the retro-reflector otherwise not responding to the receipt of any message but rather absorbing any energy contained in the inquiry signal.

22. A system of friend-or-foe identification comprising:

interrogator means carried on a first platform for generating and transmitting a laser beam containing energy;

control means for selectively steering the transmitted laser beam toward a second platform;

coding means for encoding an interrogation message and modulating a portion of the transmitted beam with the message; and, passive retro-reflector means receiving transmitted laser energy, said passive retro-reflector means normally absorbing any received laser energy and becoming activated only upon receipt of a properly encoded interrogation message regardless of the direction from which said transmitted laser beam is received, said passive retro-reflector means thereupon coding a second portion of the transmitted laser beam with a response message which is reflected back to the first platform with energy contained in said reflected laser beam being transmitted only in the opposite direction from that in which said transmitted laser beam was received, said passive retro-reflector means including a fixedly mounted, non-steerable corner cube reflector having total internal reflectance, energy absorbing means for absorbing laser energy, and positioning means for positioning the energy absorbing means against an inner end surface of said reflector whereby the coded message portion of the transmitted laser beam causes the absorbing means to vibrate against the positioning means rather than absorbing the energy in the received laser beam, vibration of the absorbing means modulating the second portion of the laser beam to code the response message and said coding means decoding said modulated second portion of said reflected laser beam to determine if said response message corresponds to a predetermined response which identifies the second platform as a "friend".

\* \* \* \* \*

UNITED STATES PATENT AND TRADEMARK OFFICE
CERTIFICATE OF CORRECTION

PATENT NO. : 5,459,470
DATED : October 17, 1995
INVENTOR(S) : John R. Wootton et al.

It is certified that error appears in the above-indentified patent and that said Letters Patent is hereby corrected as shown below:

Column 7,
Claim 16, line 43, "all" should be -- an --; and

Column 7, line 48, "positioners vibration" should be -- positioners, vibration --.

Signed and Sealed this

Thirty-first Day of December, 1996

Attest:

BRUCE LEHMAN

*Attesting Officer*    *Commissioner of Patents and Trademarks*